Feb. 14, 1967  R. L. BIRELEY  3,304,514
COUPLING CIRCUIT FOR LOW IMPEDANCE SENSING ELEMENT
Filed Nov. 27, 1963
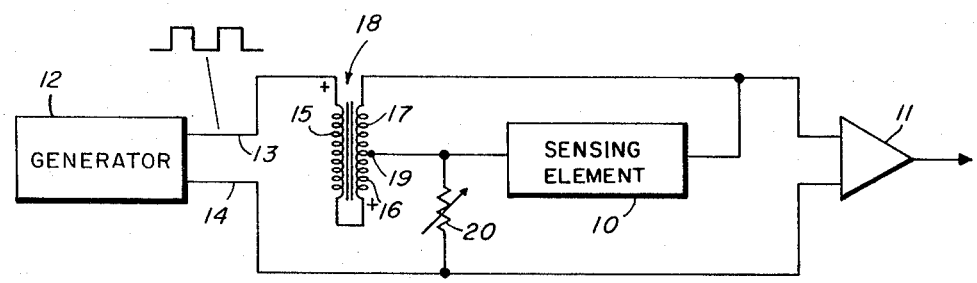
INVENTOR.
RICHARD L. BIRELEY
BY
ATTORNEYS

United States Patent Office 3,304,514
Patented Feb. 14, 1967

3,304,514
COUPLING CIRCUIT FOR LOW IMPEDANCE
SENSING ELEMENT
Richard L. Bireley, San Diego, Calif., assignor, by mesne
assignments, to the United States of America as represented by the Secretary of the Navy
Filed Nov. 27, 1963, Ser. No. 326,646
3 Claims. (Cl. 330—189)

This invention relates to transducer circuits and is particularly directed to means for deriving a strong electrical signal from those transducers which may have very low impedance.

Magneto-resistor and other type low impedance transducers are employed for converting pressure, temperature, motion and other physical variables into analogous electrical signals. The impedance of an amplifier into which such a sensing element must work is usually of relatively higher impedance so that impedance matching becomes difficult. Further, where the rate of change of the physical variable and the signal of the sensing element may be zero or very low the problem of detecting and amplifying the signal is further aggravated.

An object of this invention is to provide an improved coupling circuit for low impedance sensing elements.

A more specific object of this invention is to provide a coupling circuit for sensing elements in which the impedance of the sensing element and its amplifier or utilization circuit are effectively matched.

A still more specific object of this invention is to provide an improved coupling circuit for low impedance sensing elements in which the signal rate change may be very low.

Other objects of this invention will become apparent to those skilled in the art by referring to the specific embodiment described in the following specification and shown in the accompanying drawing.

The transducer or sensing element 10 may comprise any element which has mechanical, thermal or other properties for converting a variable quantity into a variable impedance and hence into a variable electrical signal. A magneto-resistor or ceramics are examples of elements which can convert pressure into variable resistance or voltage. In the case of such sensing elements the resistance between terminals is usually very low and the voltage amplitudes are correspondingly low. The impedance of the sensing element may be resistive or combinations of the resistance, inductance, and capacitance. The amplifier 11 is of any type which can amplify the electrical signals generated by the sensing elements 10. Since the impedances of the sensing element 10 and amplifier 11 may differ widely, they cannot be coupled directly together.

According to this invention the sensing element 10 is pulsed by the generator 12. The two output terminals of the generator are connected to the two input terminals of the amplifier through leads 13 and 14. In series with one lead is connected the primary winding 15 and the two portions 16 and 17 of the secondary windings of autotransformer 18. The division of turns of the secondary windings 16 and 17 is defined by the tap 19. The tap 19 is in turn connected to the junction between transducer 10 and the load resistor 20. The impedance of the windings 17 of the secondary which are connected directly across the transducer is determined by and matched with the impedance of the sensing element.

Generator 12 may be of any type which will produce a cyclic or pulsating periodic undulatory wave of sine or irregular wave configuration. A square wave is suitable.

In operation, the output wave of the generator is applied across the transformer primary 15, the portion 16 of the secondary, and the resistor 20, all in series. Hence, the voltage drop across resistance 20 will always be in phase with the primary 15 and the source 13–14, but the voltage induced in the secondary 16–17 is opposite in polarity to the IR drop developed across the primary and therefore opposite to the drop across the resistor. The circuit output is dependent upon the relative values of these two voltages.

The impedance of the secondary 17, at the excitation frequency is preferably selected to be greater than the minimum value of the impedance of the transducer. Thus, as the transducer varies through an impedance range, it will act as a variable shunt across the secondary 17, resulting in a change in the voltage appearing across the transformer/transducer combination. If the variable resistor 20 is set at a value of zero ohms, say, the voltage applied to the amplifier will consist only of the drop across the transducer/transformer parallel circuit and will therefore be 180° out of phase with the excitation source and have an amplitude that is a function of the transformer turns ratio and the impedance value of the transducer. Now, as the value of resistor 20 is increased, the in-phase component causes a partial cancellation of the secondary voltage, and a value of resistor 20 is reached at which the full range of variable shunting action of the transducer will result in an output voltage that varies from a maximum value, through zero, to an equal and opposite value. The excitation signal may be a sine or square wave as desired. It will be noted that this particular circuit may be adapted to a great variety of transducers of a wide range of impedances by selecting an appropriate transformer tap.

Two primary functions of the circuit are to provide impedance matching between a transducer having a very low value of resistance and an amplifier, and to permit control of the amplitude of the applied signal from zero to a maximum value. The frequency of the generator 12 may, if desired, be modulated or demodulated by any signal voltage applied at the terminals of impedance 10.

What is claimed is:
1. An impedance matching system for coupling a sensing element of relatively low impedance into the input of an amplifier of relatively high impedance, said system comprising,
    an autotransformer,
    a pulse generator, the output circuit of said generator being coupled to the input circuit of said amplifier, the primary and secondary windings of said autotransformer being connected in series in one lead between said generator and said amplifier,
    a coupling resistor, said resistor and said sensing element being connected in series across the generator-to-amplifier leads, the junction of the resistor and sensing element being connected to a point on said secondary winding so that the voltage applied across said amplifier input is a function of the impedance of said sensing element.
2. An impedance matching system for coupling a transducer of relatively low impedance into the input of an amplifier of relatively high impedance, said system comprising,
    a pulse generator, two output leads of said generator being coupled to the two input leads of said amplifier,
    an autotransformer, the primary and secondary windings of said autotransformer being connected in series in one of said leads,
    a coupling resistor, said coupling resistor and said transducer being connected in series across said two leads, and
    the junction of said resistor and transducer being con- nected to a predetermined point on the secondary winding of said autotransformer, the impedance of the portion of said secondary winding connected across said transducer being matched to the impedance of said transducer.

3. An impedance matching system for coupling a relatively low variable impedance sensing element into the input of an amplifier of relatively high impedance, said system comprising, a pulse generator, the output circuit of said generator being coupled through two leads to the input circuit of said amplifier, an autotransformer, the primary and secondary windings of said autotransformer being connected in series in one lead between said generator and said amplifier, a load resistor, said resistor being connected between a tap on said autotransformer and the other lead so that the voltage generated across said resistor produced by the current through said series circuit is of one polarity and opposite in phase to the voltage across said secondary winding induced by the primary winding, the sensing element being connected across said secondary winding so that as the resistance of said sensing element varies the amplitude of pulses applied across the input of said amplifier becomes a function of the resistance of said element.

No references cited.

ROY LAKE, *Primary Examiner.*

R. P. KANANEN, J. B. MULLINS, *Assistant Examiners.*